United States Patent
Cooper et al.

(10) Patent No.: US 10,482,446 B2
(45) Date of Patent: Nov. 19, 2019

(54) PAYMENT SYSTEM

(71) Applicant: Intel Corporation, Santa Clara, CA (US)

(72) Inventors: Geoffrey H. Cooper, Palo Alto, CA (US); Guy L. AlLee, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 15/201,414

(22) Filed: Jul. 2, 2016

(65) Prior Publication Data

US 2018/0005211 A1   Jan. 4, 2018

(51) Int. Cl.
*G06Q 20/20* (2012.01)
*G06Q 20/34* (2012.01)
*G06Q 10/00* (2012.01)

(52) U.S. Cl.
CPC ......... *G06Q 20/206* (2013.01); *G06Q 20/204* (2013.01); *G06Q 20/34* (2013.01)

(58) Field of Classification Search
USPC ........................................................ 705/18
See application file for complete search history.

(56) References Cited

U.S. PATENT DOCUMENTS

| | | | | |
|---|---|---|---|---|
| 2009/0164366 A1* | 6/2009 | Blythe | ............... | G06Q 20/0425 705/39 |
| 2014/0040147 A1* | 2/2014 | Varadarajan | ........ | H04L 63/0853 705/71 |
| 2016/0381405 A1* | 12/2016 | Smith | ................ | H04N 21/2541 725/28 |

* cited by examiner

*Primary Examiner* — Garcia Ade
(74) *Attorney, Agent, or Firm* — Patent Capital Group

(57) ABSTRACT

Particular embodiments described herein provide for an electronic device that can be configured to couple to a terminal, verify an account with an account institution using Direct Anonymous Attestation (DAA), and request an action related to the account using DAA. In an example, the DAA is accomplished using enhanced privacy identification (EPID). The account institution can be a banking institution, and the requested action can be to add an electronic representation of monetary funds to the account. In another example, the device is a payment card, the terminal is a point of sale terminal, and the requested action is related to a sale of goods or services.

22 Claims, 11 Drawing Sheets

PAYMENT SYSTEM

TECHNICAL FIELD

This disclosure relates in general to the field of information security, and more particularly, to a payment system.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information. One particular area where the disclosure of information can occur is payment systems.

Current payment systems are either entirely tracked or entirely anonymous. For example, payment card systems (e.g., credit cards, debit cards, gift cards, etc.) are tracked to a specific card and a specific account. Cash and Bitcoin are not tracked at all. Bitcoin presents an entirely separate issue as the legal status of bitcoin varies substantially from country to country. While some countries have explicitly allowed its use and trade, others have banned or restricted it. Likewise, various government agencies, departments, and courts have classified bitcoins differently. What is needed is a payment system that can be selectively tracked, where the user's trusted institution can track payments, but a malicious operator cannot easily access the information.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
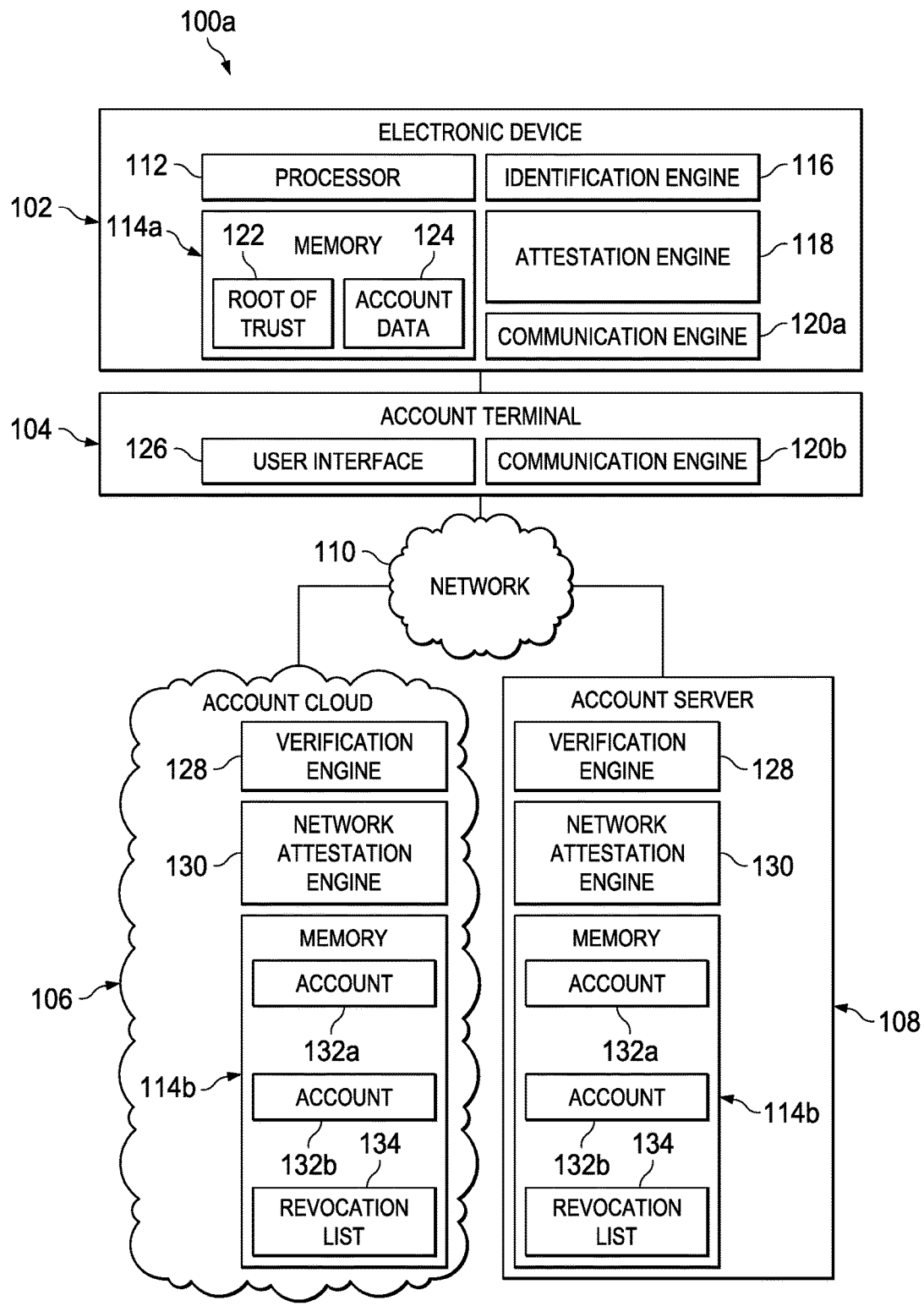
FIG. 1A is a simplified block diagram of a communication system for a payment system in accordance with an embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system configured as a payment system. Features such as structure(s), function(s), and/or characteristic(s), for example, are described with reference to one embodiment as a matter of convenience; various embodiments may be implemented with any suitable one or more of the described features.

FIG. 1 is a simplified block diagram of a communication system 100a for a payment system in accordance with an embodiment of the present disclosure. Communication system 100a can include an electronic device 102, an account terminal 104, an account cloud 106, and an account server 108. Account terminal 104, account cloud 106, and account server 108 can communicate with each other using network 110.

Electronic device 102 can include a processor 112, memory 114a, an identification engine 116, an attestation engine 118, and a communication engine 120a. Memory 114a can include a root of trust 122 and account data 124. Account terminal 104 can include a user interface 126 and a communication engine 120b. Account cloud 106 and server 108 can each include memory 114b, verification engine 128, and a network attestation engine 130. Memory 114 can include one or more accounts 132a and 132b and a revocation list 134.

In an example, identification engine 116 can be configured to help provide identification data related to electronic device 102. Attestation engine 118 can be configured to help provide attestation for transactions and communications related to electronic device 102. Communication engines 120a and 120b can be configured to help facilitate communication, between electronic device 102 and account terminal 104 and communicate data relating to coupling electronic device 102 and account terminal, to verify an account, request an action related to the account, and other similar activates. Root of trust 122 can be configured to provide a root of trust for communications related to electronic device 102 and to verify that electronic device 102 is a trusted device.

In an embodiment, electronic device 102 can be configured to couple to a terminal, verify an account with an account institution using Direct Anonymous Attestation (DAA), and request an action related to the account using DAA. In an example, the DAA is accomplished without specific device information. In a specific example, the DAA is accomplished using enhanced privacy identification (EPID). The terminal can be associated with the account institution. The account institution can be a banking institution and the requested action can be to add an electronic representation of monetary funds to the account. For example, the requested action may be to add a specific dollar amount (e.g., $10, $19.95, $20, $75, $100, $1,000, etc.) or some other currency amount (e.g., Euro, pound, rupee, peso, yen, franc, shekel, etc.) to the account. In another example, the device is a payment card, the terminal is a point of sale terminal, and the requested action is related to a sale of goods or services.

Figure 1B:
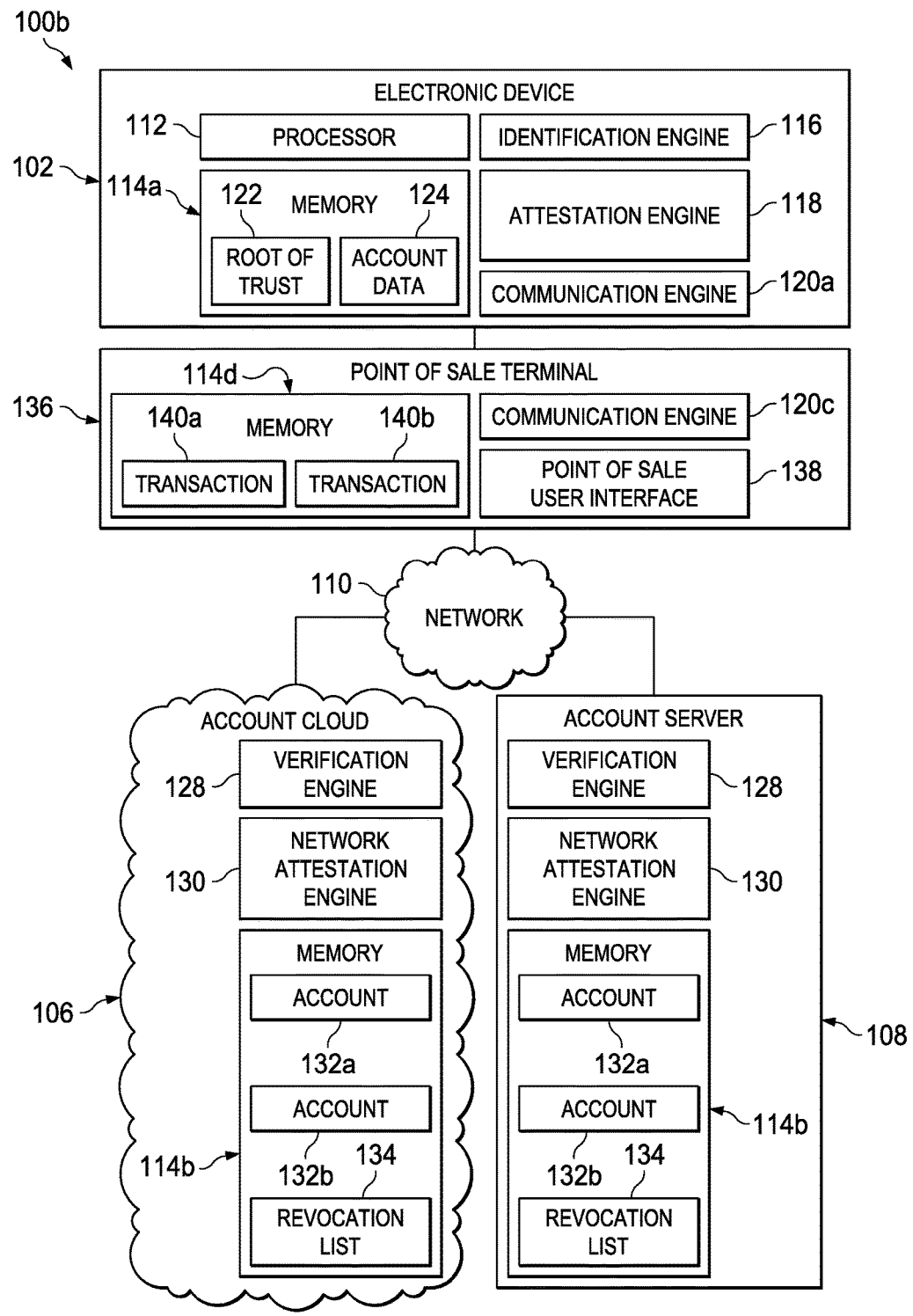
FIG. 1B is a simplified block diagram of a communication system for a payment system in accordance with an embodiment of the present disclosure.

Turning to FIG. 1B, FIG. 1B is a simplified block diagram of communication system 100b for a payment system in accordance with an embodiment of the present disclosure. Communication system 100b can include electronic device 102, account cloud 106, account server 108, and a point of sale (POS) terminal 136. POS terminal 136 can include memory 114d, a communication engine 120c, and a POS user interface 138. Memory 114d can include one or more transactions 140a and 140b. POS terminal 136, account cloud 106, and account server 108 can communicate with each other using network 110. Communication engines 120a and 120c can be configured to help facilitate communication between electronic device 102 and POS terminal 136. Each of transactions 140a and 140b can include information related to a transaction that occurred using POS terminal 136.

Elements of FIGS. 1A and 1B may be coupled to one another through one or more interfaces employing any suitable connections (wired or wireless), which provide viable pathways for network (e.g., network 110) communications. Additionally, any one or more of these elements of FIGS. 1A and 1B may be combined or removed from the architecture based on particular configuration needs. Communication system 100a may include a configuration capable of transmission control protocol/Internet protocol (TCP/IP) communications for the transmission or reception of packets in a network. Communication systems 100a and 100b may also operate in conjunction with a user datagram protocol/IP (UDP/IP) or any other suitable protocol where appropriate and based on particular needs.

In an example, communication systems 100a and 100b can be configured to include a system that allows for a payment system. In an illustrative example, using electronic device 102 as a payment card, a user can maintain a normal tracked relationship with their bank, while still being able to make payments anonymously. As a result, a user can have the convenience of a debit card payment system without requiring that transactions are traced at all times.

For purposes of illustrating certain example techniques of communication system 100a and 100b, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is using a payment system. A payment system is generally defined as any system used to settle transactions through the transfer of monetary value. For example, a common type of payment system is a network that links bank accounts to a debit card or a smart phone and provides for a monetary exchange using a bank account.

Typically, a payment system is used as a cash-substitute. With the advent of computers and electronic communications, a large number of alternative electronic payment systems have emerged. These include debit cards, credit cards, electronic funds transfers, direct credits, direct debits, internet banking and e-commerce payment systems. Each of these payment systems are used in lieu of tendering cash and each transaction can be easily traced. What is needed is a payment system that can be selectively tracked, where a user's trusted institution can track payments, but a malicious operator cannot easily access the information.

A communication system that includes a payment system, as outlined in FIGS. 1A and 1B, can resolve these issues (and others). In an example, electronic device 102 can be configured to couple to a terminal such as account terminal 104 or POS terminal 136 and verify an account (e.g., account 132a) associated with electronic device 102 using DAA. The verification can include that the account is associated with electronic device 102 and is an active account (e.g., no holds are on the account, the account has the proper funds, etc.). Once coupled, an action related to the account can be requested using DAA. For example, the action may include adding a representation of monetary funds to account data 124 or using the representation of monetary funds in account data 124 to purchase goods or services.

Account data 124 can be configured to store a representation of money or some other data or resource that may be used in a transaction. For example, account data 124 could include data that may be used in a barter transaction. The term "barter transaction" is used to describe a barter or exchange where goods or services are directly exchanged for other goods or services without using a medium of exchange, such as money or monetary funds. For example, account data 124 could include network credits that may be used to access a network such as the Internet or a secure private network.

In a specific example of communication systems 100a and 100b, a payment card is based on a secure environment (e.g., a trusted execution environment) that is signed with a security key (e.g., an EPID key). The security key can be configured to include both a random state and a named base. The secure environment can be configured to attest to being in a trustworthy state both anonymously, using the security key random base, and non-anonymously, using the security key named base.

In an example, a unique membership key can be issued along with a membership credential on the membership key in a blind fashion such that the issuer does not acquire knowledge of the membership key. The membership key and the membership credential together form a private key. To sign a signature, a device (e.g., electronic device 102) proves in zero-knowledge that it has a membership credential on the membership key. To verify a group signature, the verifier can verify the zero-knowledge proof. Also, a device can select a base value "B" and compute a K value where the K value is equal to the base value to the power of the membership key. To sign a signature, a device not only needs to prove that it has a valid membership credential but also needs to prove that it correctly creates a (B,K) pair in zero-knowledge. In an example, there are two options to create the base value "B." The first is the security key random base and includes a random base option where "B" is chosen randomly each time by the electronic device. The second is the security key named base where "B" is derived from the verifier's or account institution's base name.

In an example, to engage in a transaction or make a payment, an electronic device (e.g., electronic device 102) must first be loaded. More specifically, a fixed amount of money can be transferred to the electronic device using account terminal 104. The electronic device can then be transported to a location (e.g., retail site) where the money on the electronic device can be used in a transaction. In another example, the electronic device may be loaded with data or resources (e.g., network time, credits, etc.) that can be used in a barter transaction.

In a specific example, to add money to the electronic device, the electronic device can be used in a named base mode or configuration with an account institution that is associated with the electronic device. For example, to add money to electronic device 102, electronic device 102 can be coupled to account terminal 104 in a named base mode. Account terminal 104 can be in communication with account cloud 106 or account server 108 where an account (e.g., account 132a) that is associated with electronic device 102 is stored. This can be done using an adapter to a personal computer or tablet or a special mode of the card itself. In a specific example, using an EPID named base mode, an account institution can completely identify the electronic device and track payments made using the electronic device, similar to a public key infrastructure (PKI). In another specific example, the named base configuration can be entered into or created using an identification such as a personal identification number (PIN). Attestation engine 118 can be configured to authenticate the identification for electronic device 102 and can be used to authorize adding money to electronic device 102. The added money can be stored in account data 124. In this way, electronic device 102 cannot access an account (e.g., account 132a) associated with the electronic device unless the identification is properly entered and verified by network attestation engine 130.

Once the electronic device is loaded with money, data, or resources the electronic device can be transported to a POS station (e.g., POS terminal 136) that supports the use of the electronic device. To make a payment, the the electronic device can be coupled to the POS terminal. The POS terminal can be configured to accept a payment for a transaction using a simple request-response protocol. The POS terminal may make an assertion about its safety to the electronic device by signing a nonce generated by the electronic device. The electronic device has roots of trust (e.g., root of trust 122) it can use to verify the electronic device and the transaction. In an example, the roots of trust can be updated periodically when the electronic device is filled. In a specific example, the POS terminal can use conventional PKI or EPID signatures. If the POS terminal uses EPID, then the POS terminal may anonymously authorize a payment.

The POS terminal can communicate with an account cloud or account server and sign the transaction (e.g., transaction 140a) with a random base (e.g., EPID nonce) from the account cloud or account server to the electronic device via the POS as well as a device attestation of the electronic device itself. The account cloud or account server can verify the signature and device attestation using information made available to it by the public key owner (e.g., account cloud 106 or account server 108). This information can be delivered to the account cloud or account server in real time or in a batch. If the account cloud or account server approves the transaction, the electronic device decrements its own money supply, and the account cloud or account server transfers cash to cover the transaction. The POS serves to connect the card with the account cloud or account server, and can monitor the protocol. When the POS recognizes that the transaction is approved, it can signal the sale and generate the paper receipt.

Turning to the infrastructure of FIGS. 1A and 1B, communication systems 100a and 100b are shown in accordance with an example embodiment. Generally, communication systems 100a and 100b can be implemented in any type or topology of networks. Network 110 represent a series of points or nodes of interconnected communication paths for receiving and transmitting packets of information that propagate through communication systems 100a and 100b. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a and 100b, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, account terminal 104, account cloud 106, account server 108, and a point of sale (POS) terminal 136 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, each of electronic device 102, account terminal 104, account cloud 106, account server 108, and a point of sale (POS) terminal 136 can include memory elements for storing information to be used in the operations outlined herein. Each of electronic device 102, account terminal 104, account cloud 106, account server 108, and a point of sale (POS) terminal 136 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic device 102, account terminal 104, account cloud 106, account server 108, and POS terminal 136 may include software modules (e.g., identification engine 116, attestation engine 118, communication engines 120a-120c, verification engine 128, network attestation engine 130, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, account terminal 104, account cloud 106, account server 108, and a point of sale (POS) terminal 136 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, mobile devices, laptop computers, desktop computers, personal digital assistants, smartphones, tablets, wearables, or other similar devices. Cloud services 106 is configured to provide cloud services to electronic device 102, account terminal 104, and POS terminal 136. Cloud services may generally be defined as the use of computing resources that are delivered as a service over a network, such as the Internet. The services may be distributed and separated to provide required support for electronic device 102, account terminal 104, and point of sale terminal 136. Typically, compute, storage, and network resources are offered in a cloud infrastructure, effectively shifting the workload from a local network to the cloud network. Server 108 can be a network element such as a server or virtual server and can be associated with clients, customers, endpoints, or end users wishing to initiate a communication in communication system 100a via some network (e.g., network 110). The term 'server' is inclusive of devices used to serve the requests of clients and/or perform some computational task on behalf of clients within communication systems 100a. Although verification engine 128 and network attestation engine 130 are represented in FIGS. 1A and 1B as being located in cloud services 106 and server 108 respectively, this is for illustrative purposes only. Verification engine 128 and network attestation engine 130 could be combined or separated in any suitable configuration. Furthermore, verification engine 128 and network attestation engine 130 could be integrated with or distributed in another network accessible by account terminal 104 and POS terminal 136.

Figure 2:
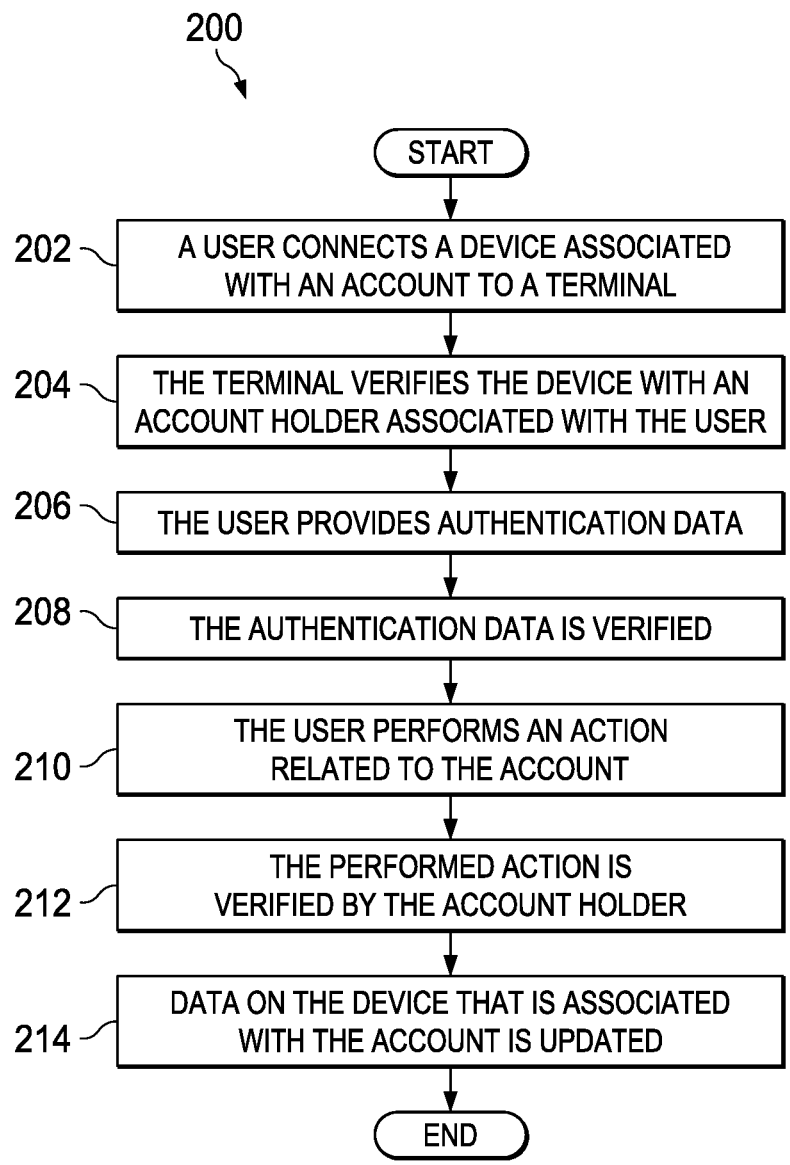
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with a payment system, in accordance with an embodiment. In an embodiment, one or more operations of flow 200 may be performed by one or more of identification engine 116, attestation engine 118, communication engines 120a-120c, verification engine 128, and network attestation engine 130. At 202, a user connects a device associated with an account to a terminal. For example, a user may connect electronic device 102 to account terminal 104. The connection may be a physical connection (e.g., electronic device is a card and the card is slid into a slot on account terminal 104) or the connection may be a wireless connection (e.g., Bluetooth, personal area network (PAN), etc.). At 204, the terminal verifies the device with an account institution associated with the user or account. For example, account terminal 104 can use communication engine 120b and verify electronic device 102 is associated with account 132a in account cloud 106 or account server 108 using DAA. In an example, verification engine 128 can be used to verify electronic device using DAA. In another example, revocation list 134 can be checked to see if electronic device 102 is listed in revocation list 134 and if it is, then electronic device 102 can be deemed to be no longer verified or valid. At 206, the user provides authentication data. For example, user interface 126 can be configured to allow the user to input a single instance or any combination of a pin, passcode, biometric data such as a finger print, lip print, DNA from skin, blood, hair, or saliva, facial recognition, voice recognition, eye scan, etc. or some other type of verification used to identify a user. In addition, the user's identification can include the name of the account holder, location of the account holder, address of the account holder, last deposit from the account holder, frequency of deposits by the account holder, last transaction over a specific amount (e.g., last check or withdraw of $1000), account holder's FICO score, or some other data or information that can be used to verify the identity of the user. At 208, the authentication data is verified. For example, the input collected by user interface 126 can be communicated to verification engine 128 in account cloud 106 or account server 106 for verification. At 210, the user performs an action related to the account. At 212, the performed action is verified by the account institution. For example, the performed action may be verified using DAA. At 214, data on the device that is associated with the account is updated. For example, using user interface 126, a user can withdraw funds from account 132*a*, verification engine 128 can verify that the action or withdraw of funds is to be allowed, and account data 124 can be updated to reflect the amount of funds withdrawn. For example, verification engine 128 can verify that account 132*a* is associated with electronic device 102 and that account 132*a* is an active account (e.g., the account is valid and not a spoof account, no holds are on the account, etc.).

Figure 3:
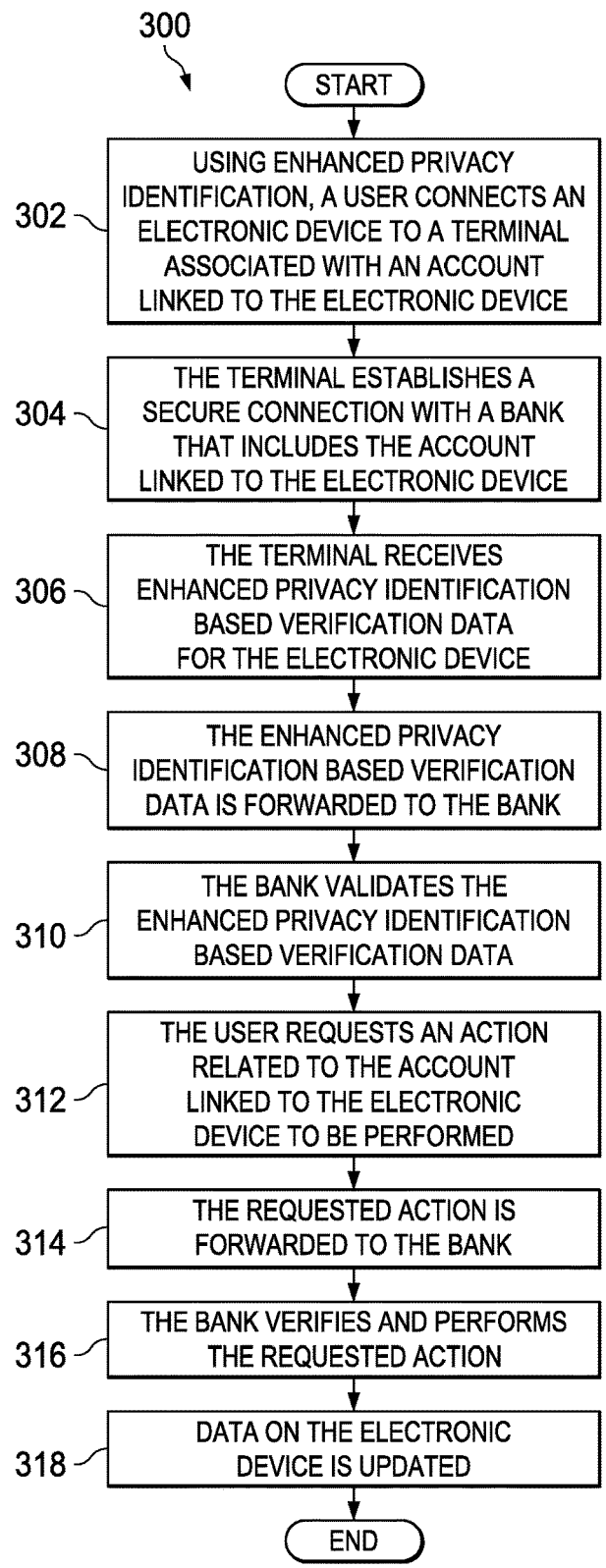
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with a payment system, in accordance with an embodiment. In an embodiment, one or more operations of flow 300 may be performed by one or more of identification engine 116, attestation engine 118, communication engines 120*a*-120*c*, verification engine 128, network attestation engine 130. At 302, using EPID, a user connects an electronic device to a terminal associated with an account linked to the electronic device. For example, a user may connect electronic device 102 to account terminal 104. At 304, the terminal establishes a secure connection with a bank that includes the account linked to the electronic device. For example, account terminal 104 may establish a secure connection to account cloud 106 or account server 108 that includes account 132*a* linked to electronic device 102. At 306, the terminal receives EPID based verification data for the electronic device. In an example, the verification data is DAA based verification data. At 308, the EPID based verification data is forwarded to the bank. At 310, the bank validates the EPID based verification data. For example, verification engine 128 may be used to validate the EPID based verification data. In another example, verification engine 128 may be used to validate the DAA based verification data. At 312, the user requests an action related to the account linked to the electronic device to be performed. At 314, the requested action is forwarded to the bank. At 316, the bank verifies and performs the requested action. At 318, data on the electronic device is updated. For example, account data 124 may be updated.

Figure 4A:
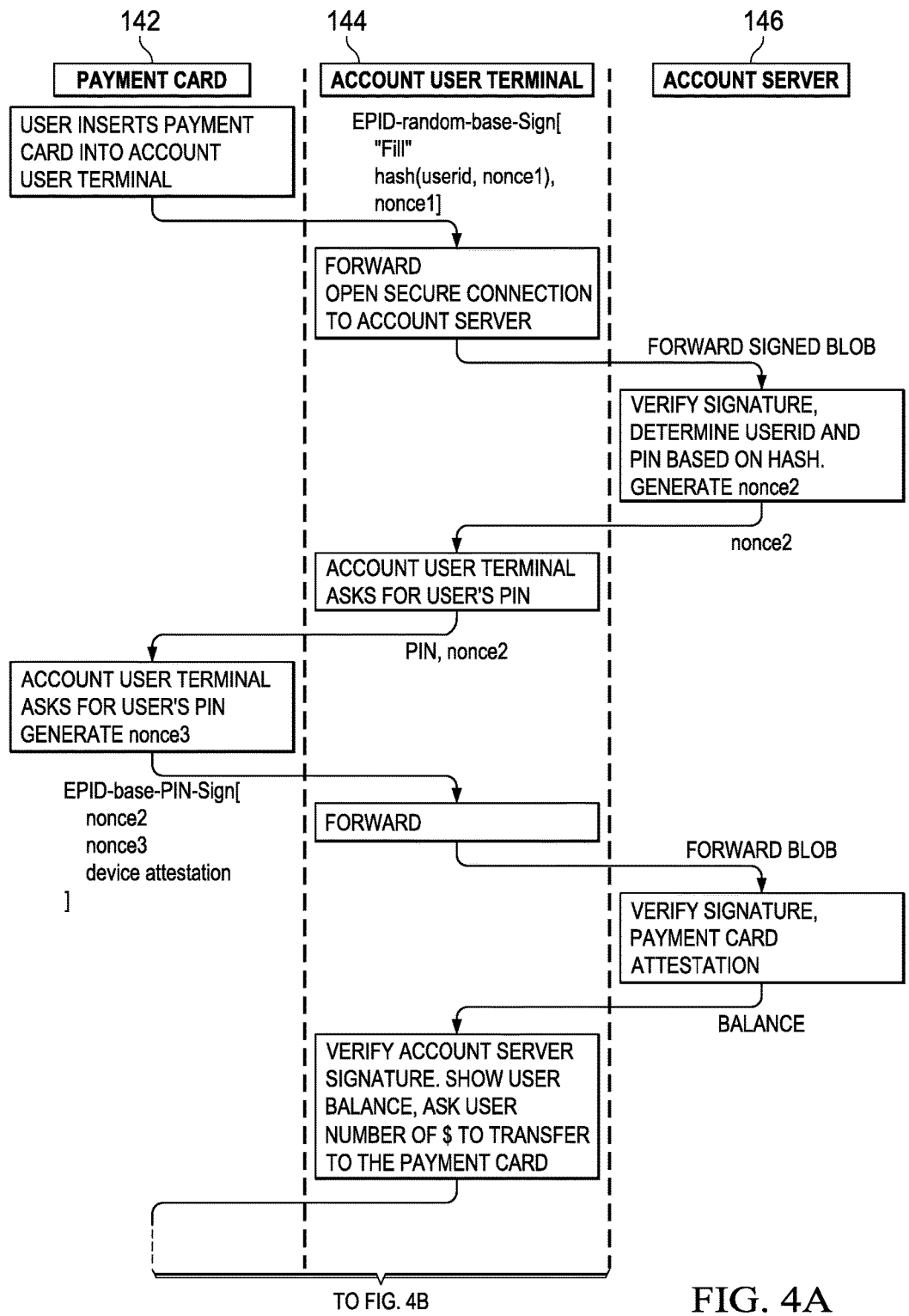
FIGS. 4A and 4B are a simplified timing flow diagram illustrating potential operations that may be associated with the communication system in accordance with an embodiment.
Figure 4B:
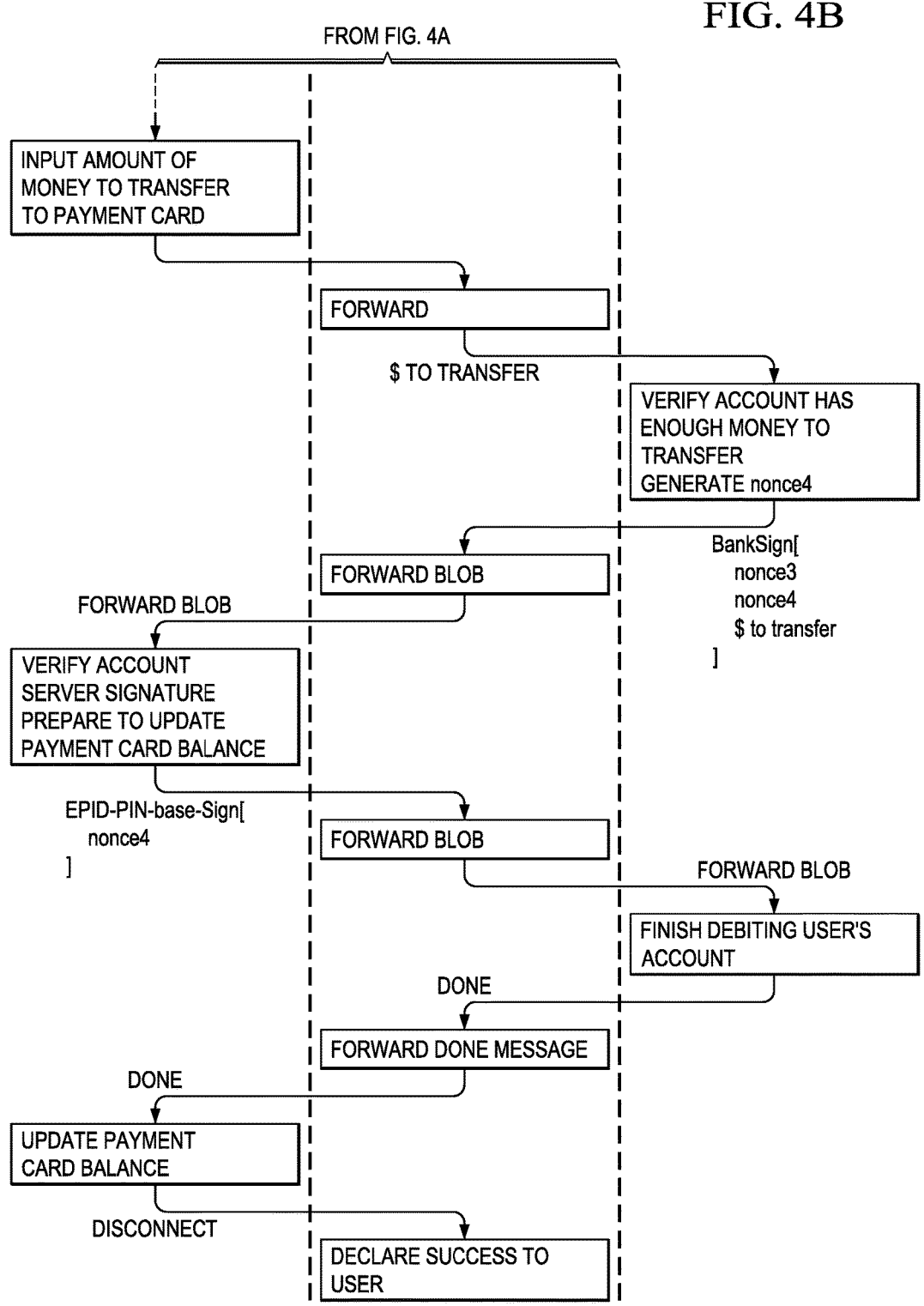

Turning to FIGS. 4A and 4B, FIGS. 4A and 4B are an example timing flow diagram illustrating possible operations that may be associated with a payment system, in accordance with an embodiment. In an embodiment, payment card 142, account user terminal 144, and account server 146 may be in communication using a network (e.g., network 110, not shown). In an example, payment card 142 is similar to electronic device 102, account user terminal 144 is similar to account terminal 104, and account server 146 is similar to account cloud 106 and account server 108.

As illustrated in FIGS. 4A and 4B, a user connects payment card 142 to account user terminal 144 using EPID. User terminal 144 receives EPID based verification data for payment card 142 and forwards the EPID based verification data to account server 146. Account server 146 verifies the EPID based verification data and sends an acknowledgment of the verification back to account user terminal 144. Account user terminal 144 can ask for a user's identification and forward the received user's identification to account server 146 where account server 146 can verify the user's identification. The user's identification can include a single instance or any combination of a pin, passcode, biometric data such as a finger print, lip print, DNA from skin, blood, hair, or saliva, facial recognition, voice recognition, eye scan, etc. or some other type of verification used to identify a user. In addition, the user's identification can include the name of the account holder, location of the account holder, address of the account holder, last deposit from the account holder, frequency of deposits by the account holder, last transaction over a specific amount (e.g., last check or withdraw of $1000), account holder's FICO score, or some other data or information that can be used to verify the identity of the user. In an example, account user terminal can communicate account details to the user. More specifically, a user interface (e.g., user interface 126) can display an account balance and the user can perform some action related to the account such as withdraw money to put on payment card 142. Using the user interface, a user can input an amount of money to transfer to payment card 142. Account user terminal 144 can forward the transfer request to account server 146. Account server 146 can verify that the account associated with the payment card has enough money to transfer to payment card 142, the account is valid and not a spoof account, no holds are on the account, etc. After account server 146 has verified there is enough money in the account to transfer to payment card 142, the money is transferred to the payment card 142, the account on account server 146 is updated, and the balance on the payment card is updated. The connection may be a physical connection (e.g., electronic device is a card and the card is inserted into a slot on POS terminal 136) or the connection may be a wireless connection (e.g., Bluetooth, personal area network (PAN), etc.).

Figure 5:
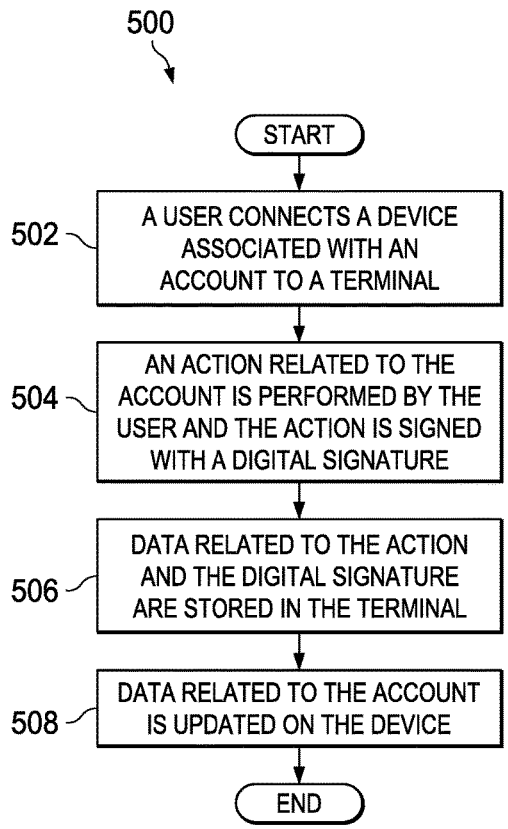
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with a payment system, in accordance with an embodiment. In an embodiment, one or more operations of flow 500 may be performed by one or more of identification engine 116, attestation engine 118, communication engines 120*a*-120*c*, verification engine 128, and network attestation engine 130. At 502, a user connects a device associated with an account to a terminal. For example, electronic device 102 may be connected to POS terminal 136 and electronic device 102 may be associated with account 132*a*. At 504, an action related to the account is performed by the user and the action is signed with a digital signature. In an example, the digital signature can be used to verify that the transaction occurred using the electronic device 102. At 506, data related to the action and the digital signature are stored in the terminal. At 508, data related to the account is updated on the device. For example, account data 124 can be updated to reflect the occurrence of the transaction. The transaction may be to debit or credit an account or some other type of transaction that may occur at the POS terminal, register, kiosk, etc.

Figure 6:
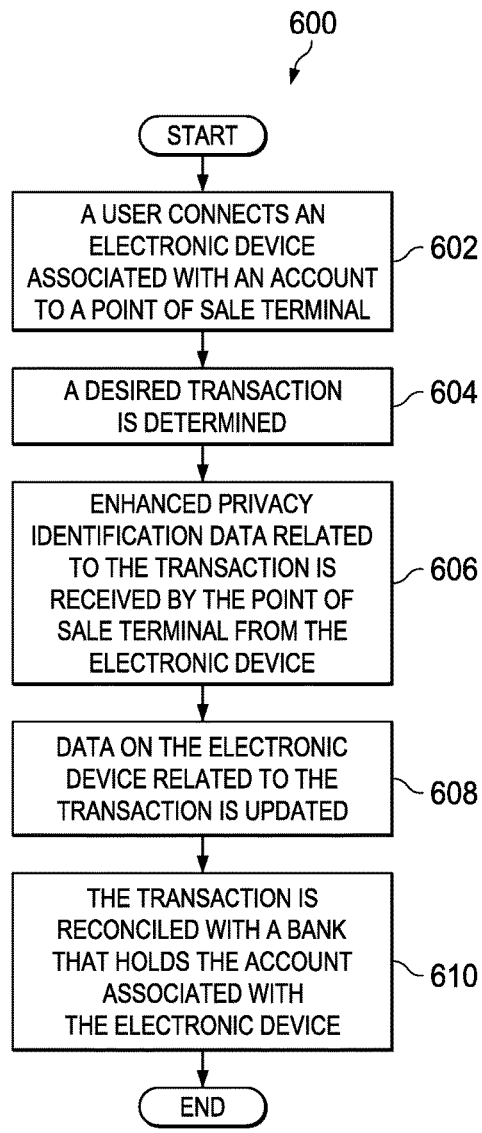
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with a payment system, in accordance with an embodiment. In an embodiment, one or more operations of flow 600 may be performed by one or more of identification engine 116, attestation engine 118, communication engines 120*a*-120*c*, verification engine 128, and network attestation engine 130. At 602, a user connects an electronic device associated with an account to a POS terminal. At 604, a desired transaction is determined. For example, the transaction may be to debit or credit an account or some other type of transaction that may occur at the POS terminal, register, kiosk, etc. In another example, the transaction may be a barter transaction. At 606, EPID data related to the transaction is received by the POS terminal from the electronic device. In an example, DAA data related to the transaction is received by the POS terminal from the electronic device. At 608, data on the electronic device related to the transaction is updated. At 610, the transaction is reconciled with a bank that holds the account associated with the electronic device.

Figure 7:
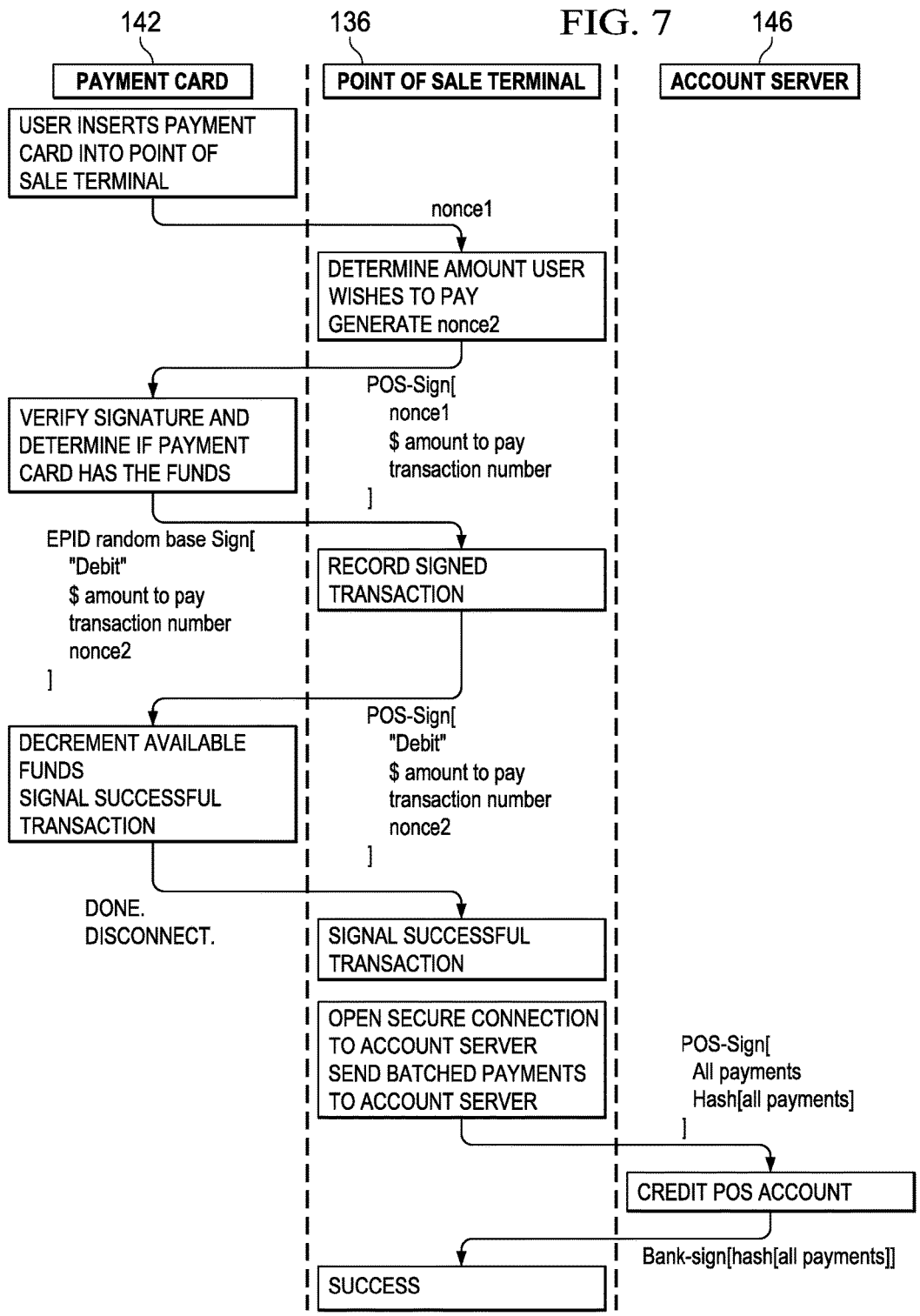
FIG. 7 is a simplified timing flow diagram illustrating potential operations that may be associated with the communication system in accordance with an embodiment.

Turning to FIG. 7, FIG. 7 is an example timing flow diagram illustrating possible operations that may be associated with a payment system, in accordance with an embodiment. In an embodiment, payment card 142, POS terminal 136, and account server 146 may be in communication using a network (e.g., network 110, not shown). As illustrated in FIG. 7, a user inserts payment card 142 into POS terminal 136. POS terminal 136 determines an amount a user wants to pay for the transaction. Payment card 142 can verify the transaction and determine if the payment card has the funds to complete the transaction. The transaction can be recorded and signed by POS terminal 136. Payment card 142 can decrement the funds on payment card 142 and send a message that the transaction was successful. POS terminal 136 can verify the transaction was successful and batch the transaction with previous transactions. POS terminal 136 can open a secure transaction to account server 146 and send the batched transactions to account server 146. Account server 146 can reconcile the transactions and add the amount of the transactions to a POS account.

Figure 8:
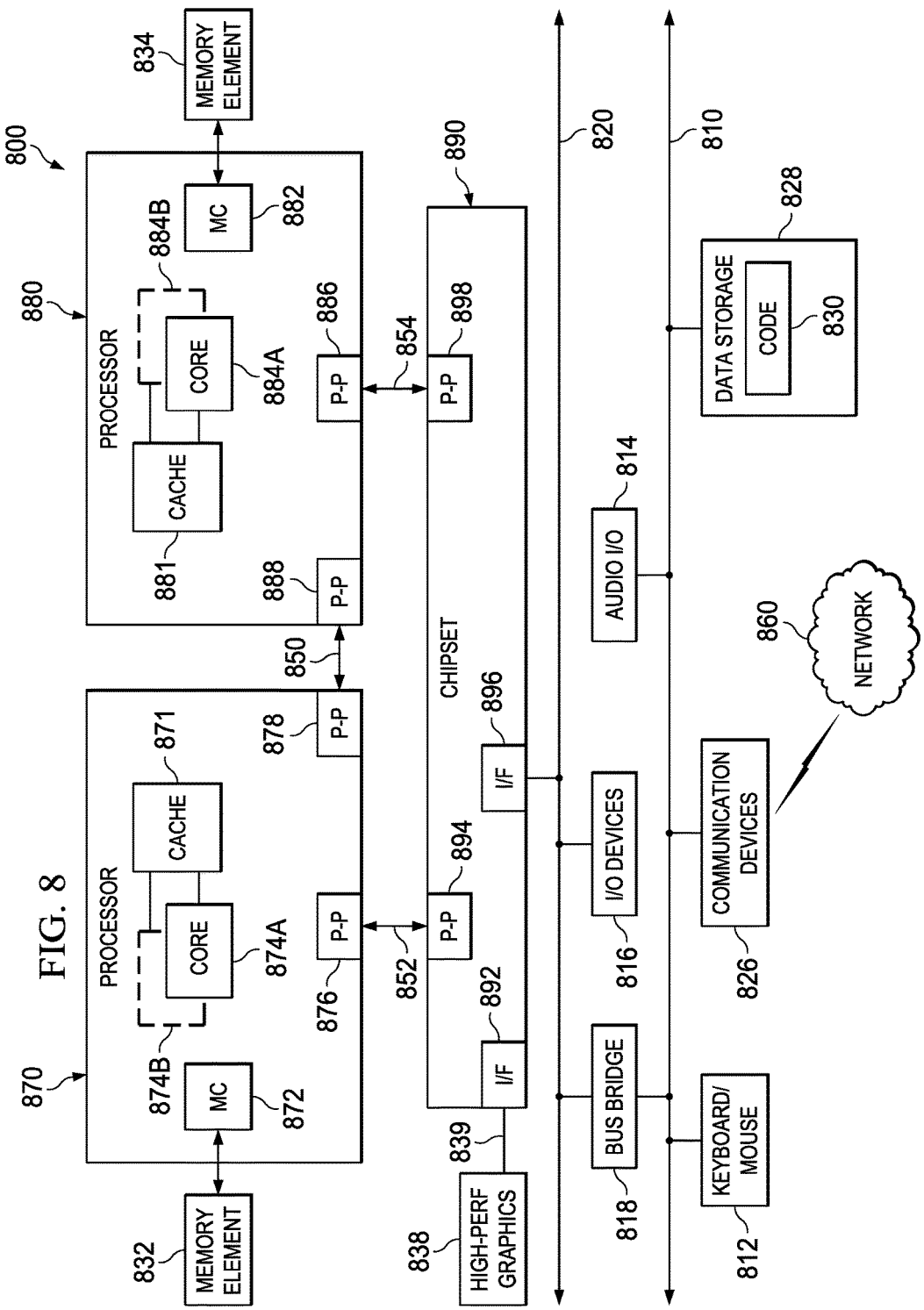
FIG. 8 is a block diagram illustrating an example computing system that is arranged in a point-to-point configuration in accordance with an embodiment.

Turning to FIG. 8, FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements of communication system 100 may be configured in the same or similar manner as computing system 800. More specifically, identification engine 116, attestation engine 118, communication engines 120a-120c, verification engine 128, and network attestation engine 130 can be configured in the same or similar manner as computing system 800.

As illustrated in FIG. 8, system 800 may include several processors, of which only two, processors 870 and 880, are shown for clarity. While two processors 870 and 880 are shown, it is to be understood that an embodiment of system 800 may also include only one such processor. Processors 870 and 880 may each include a set of cores (i.e., processor cores 874A and 874B and processor cores 884A and 884B) to execute multiple threads of a program. The cores may be configured to execute instruction code in a manner similar to that discussed above with reference to FIGS. 1-7. Each processor 870, 880 may include at least one shared cache 871, 881. Shared caches 871, 881 may store data (e.g., instructions) that are utilized by one or more components of processors 870, 880, such as processor cores 874 and 884.

Processors 870 and 880 may also each include integrated memory controller logic (MC) 872 and 882 to communicate with memory elements 832 and 834. Memory elements 832 and/or 834 may store various data used by processors 870 and 880. In alternative embodiments, memory controller logic 872 and 882 may be discrete logic separate from processors 870 and 880.

Processors 870 and 880 may be any type of processor and may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 9:
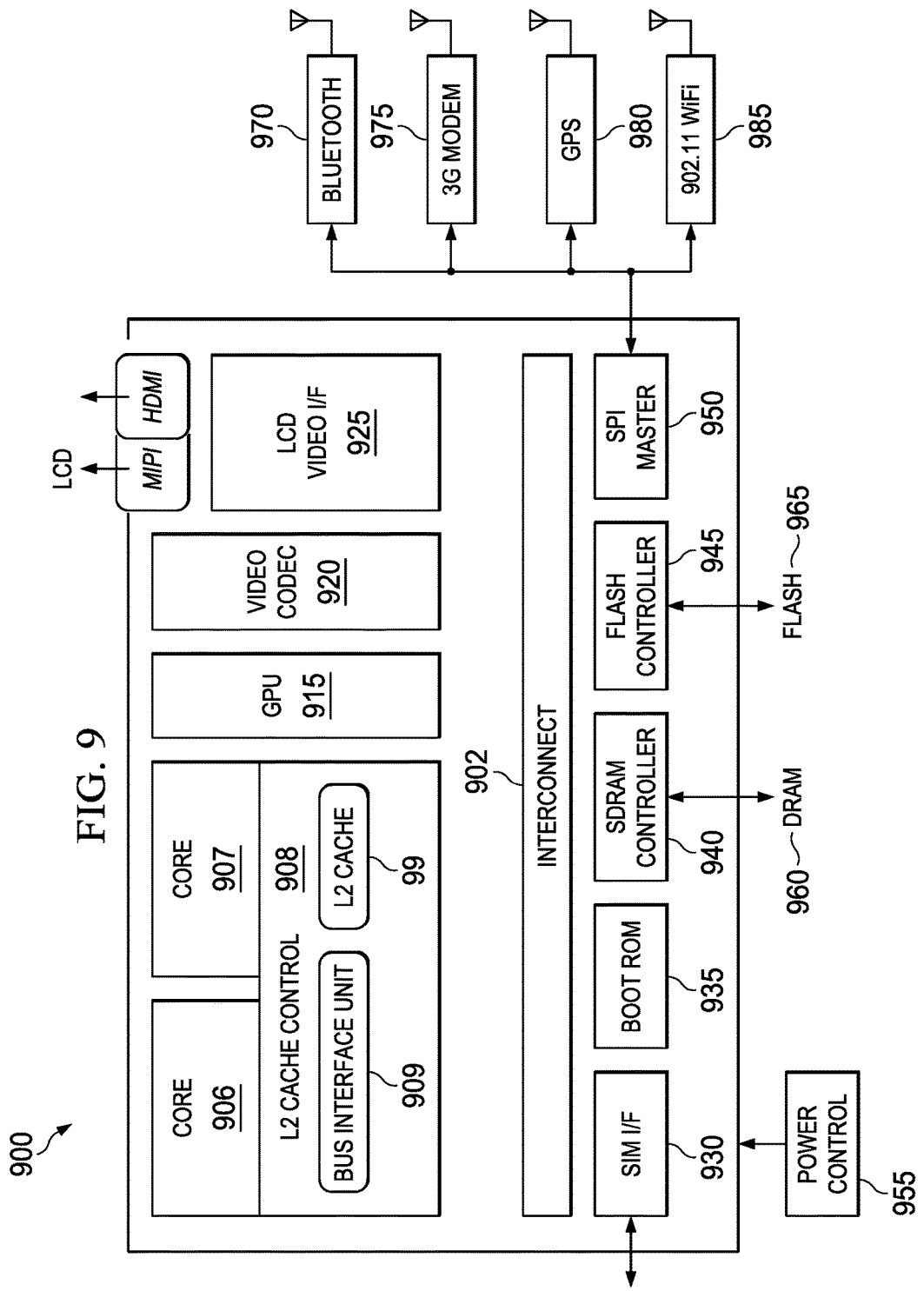
FIG. 9 is a simplified block diagram associated with an example ecosystem system on chip (SOC) of the present disclosure.

Turning to FIG. 9, FIG. 9 is a simplified block diagram associated with an example ecosystem SOC 900 of the present disclosure. At least one example implementation of the present disclosure can include the device pairing in a local network features discussed herein. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc. In an example, identification engine 116, attestation engine 118, communication engines 120a-120c, verification engine 128, and network attestation engine 130 can be configured in the same or similar architecture as SOC 900.

In this example of FIG. 9, ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

Ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 10:
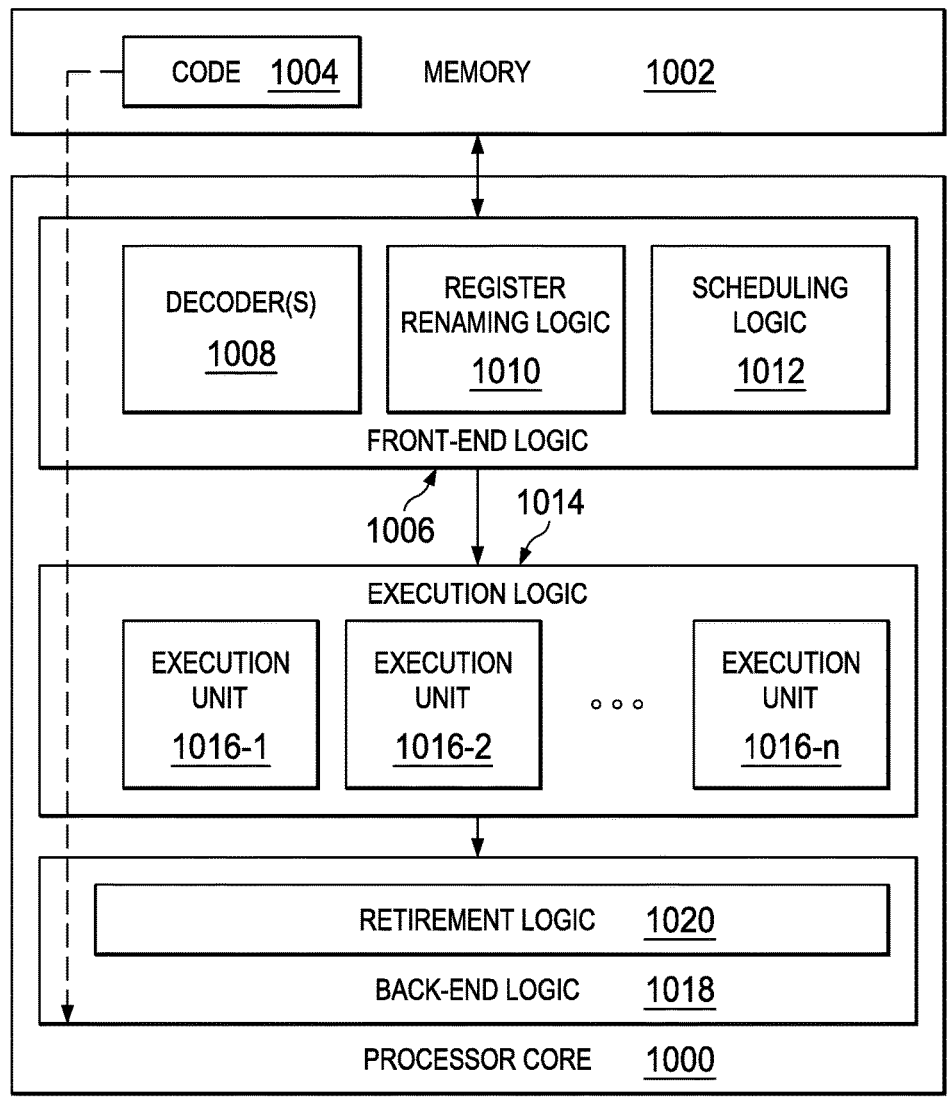
FIG. 10 is a block diagram illustrating an example processor core in accordance with an embodiment.

FIG. 10 illustrates a processor core 1000 according to an embodiment. Processor core 1000 may be the core for any type of processor, such as a micro-processor, an embedded processor, a digital signal processor (DSP), a network processor, or other device to execute code. Although only one processor core 1000 is illustrated in FIG. 10, a processor may alternatively include more than one of the processor core 1000 illustrated in FIG. 10. For example, processor core 1000 represents one example embodiment of processors cores 1074a, 1074b, 1084a, and 1084b shown and described with reference to processors 1070 and 1080 of FIG. 10. Processor core 1000 may be a single-threaded core or, for at least one embodiment, processor core 1000 may be multi-threaded in that it may include more than one hardware thread context (or "logical processor") per core.

FIG. 10 also illustrates a memory 1002 coupled to processor core 1000 in accordance with an embodiment. Memory 1002 may be any of a wide variety of memories (including various layers of memory hierarchy) as are known or otherwise available to those of skill in the art. Memory 1002 may include code 1004, which may be one or more instructions, to be executed by processor core 1000. Processor core 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor core 1000 can also include execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor core 1000 allows out of order execution but requires in order retirement of instructions. Retirement logic 1020 may take a variety of known forms (e.g., re-order buffers or the like). In this manner, processor core 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processor may include other elements on a chip with processor core 1000, at least some of which were shown and described herein with reference to FIG. 8. For example, as shown in FIG. 8, a processor may include memory control logic along with processor core 1000. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams and timing diagrams (i.e., FIGS. 2-7) illustrate only some of the possible correlating scenarios and patterns that may be executed by, or within, communication systems 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a and 100b have been illustrated with reference to particular elements and operations that facilitate the communication process, these elements and operations may be replaced by any suitable architecture, protocols, and/or processes that achieve the intended functionality of communication systems 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to couple to a terminal, verify an account with an account institution using Direct Anonymous Attestation (DAA), and request an action related to the account using DAA.

In Example C2, the subject matter of Example C1 can optionally include where the DAA is accomplished without specific device information.

In Example C3, the subject matter of any one of Examples C1-C2 can optionally include where the DAA is accomplished using enhanced privacy identification (EPID).

In Example C4, the subject matter of any one of Examples C1-C3 can optionally include where the account is updated when the requested action is verified.

In Example C5, the subject matter of any one of Examples C1-C4 can optionally include where the requested action is part of a barter transaction.

In Example C6, the subject matter of any one of Examples C1-C5 can optionally include where the instructions, when executed by the at least one processor, further cause the at least one processor to communicate authentication data to the terminal.

In Example C7, the subject matter of any one of Examples C1-C6 can optionally include where the terminal is associated with the account institution.

In Example C8, the subject matter of any one of Examples C1-C7 can optionally include where the account institution is a banking institution and the requested action is to add an electronic representation of monetary funds to the account.

In Example C9, the subject matter of any one of Examples C1-C8 can optionally include where the terminal is a point of sale terminal.

In Example C10, the subject matter of any one of Example C1-C9 can optionally include where the requested action is related to a sale of goods or services.

In Example C11, the subject matter of any one of Examples C1-C10 can optionally include where the at least one machine readable medium is included in a payment card.

In Example A1, an apparatus can include a communication engine. The communication engine can be configured to communicate data to allow the apparatus to couple to a terminal, verify an account with an account institution using Direct Anonymous Attestation (DAA), and request an action related to the account using DAA.

In Example, A2, the subject matter of Example A1 can optionally include where the DAA is accomplished without specific device information.

In Example A3, the subject matter of any one of Examples A1-A2 can optionally include where the DAA is accomplished using enhanced privacy identification (EPID).

In Example A4, the subject matter of any one of Examples A1-A3 can optionally include where the account is updated when the requested action is verified.

In Example A5, the subject matter of any one of Examples A1-A4 can optionally include where the pairing module is further configured to communicate authentication data to the terminal.

In Example A6, the subject matter of any one of Examples A1-A5 can optionally include where the terminal is associated with the account institution.

In Example A7, the subject matter of any one of Examples A1-A6 can optionally include where the account institution is a banking institution and the requested action is to add an electronic representation of monetary funds to the account.

In Example A8, the subject matter of any one of Examples A1-A7 can optionally include where the terminal is a point of sale terminal.

In Example A9, the subject matter of any one of Examples A1-A8 can optionally include where the apparatus is a payment card and the requested action is related to a sale of goods or services.

Example M1 is a method including coupling to a terminal, verifying an account with an account institution using Direct Anonymous Attestation (DAA), and requesting an action related to the account using DAA.

In Example M2, the subject matter of Example M1 can optionally include where the DAA is accomplished without specific device information.

In Example M3, the subject matter of any one of the Examples M1-M2 can optionally include where the DAA is accomplished using enhanced privacy identification (EPID).

In Example M4, the subject matter of any one of the Examples M1-M3 can optionally include where the account is updated when the requested action is verified.

In Example M5, the subject matter of any one of the Examples M1-M4 can optionally include where communicating authentication data to the terminal.

In Example M6, the subject matter of any one of the Examples M1-M5 can optionally include where the terminal is associated with the account institution.

In Example M7, the subject matter of any one of the Examples M1-M6 can optionally include where the account institution is a banking institution and the requested action is to add an electronic representation of monetary funds to the account.

In Example M8, the subject matter of any one of the Examples M1-M7 can optionally include where registration data for the local network device and the registration data for the electronic device includes local network identification.

In Example M9, the subject matter of any one of the Examples M1-M8 can optionally include where the terminal is a point of sale terminal and the requested action is related to a sale of goods or services.

Example S1 is a payment system that includes a payment card configured to couple to a terminal, verify an account with an account institution using Direct Anonymous Attestation (DAA), and request an action related to the account using DAA.

In Example S2, the subject matter of Example S1 can optionally include where the DAA is accomplished using enhanced privacy identification (EPID).

In Example S3, the subject matter of any of the Examples S1-S2 can optionally include where the account is updated when the requested action is verified.

In Example S4, the subject matter of any of the Examples S1-S3 can optionally include where the terminal is associated with the account institution, the account institution is a banking institution, and the requested action is to add an electronic representation of monetary funds to the account.

In Example S5, the subject matter of any of the Examples S1-S4 can optionally include where the terminal is a point of sale terminal and the requested action is related to a sale of goods or services.

Example X1 is a machine-readable storage medium including machine-readable instructions to implement a method or realize an apparatus as in any one of the Examples A1-A9, or M1-M9. Example Y1 is an apparatus comprising means for performing of any of the Example methods M1-M9. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one machine readable medium comprising one or more instructions that when executed by at least one processor, cause the at least one processor to:
couple an electronic device to a physical point of sale terminal using enhanced privacy identification (EPID), wherein the electronic device includes a monitory account;
verify the monitory account with an account institution using EPID; and
request an action related to the monitory account using an EPID key, wherein the EPID key includes an anonymous EPID random base and a non-anonymous EPID named base, wherein the requested action is related to a sale of goods or services and includes changing a monitory value of the monitory account, wherein the monitory account is updated when the requested action is verified.

2. The at least one machine readable medium of claim 1, wherein the EPID verification is accomplished without specific electronic device information.

3. The at least one machine readable medium of claim 1, wherein the requested action is part of a barter transaction.

4. The at least one machine readable medium of claim 1, further comprising one or more instructions that when executed by the at least one processor, cause the at least one processor to:
communicate authentication data to the terminal.

5. The at least one machine readable medium of claim 1, wherein the account institution is a banking institution and the requested action is to add an electronic representation of monetary funds to the monitory account.

6. The at least one machine readable medium of claim 1, wherein the terminal provides power for the at least one processor.

7. The at least one machine readable medium of claim 1, wherein the at least one machine readable medium is included in a payment card.

8. An apparatus comprising:
a communication engine, wherein the communication engine is configured to communicate data to allow the apparatus to:
couple an electronic device to a point of sale terminal using enhanced privacy identification (EPID), wherein the electronic device includes a monitory account;
verify the monitory account with an account institution using EPID; and
request an action related to the monitory account using an EPID key, wherein the EPID key includes an anonymous EPID random base and a non-anonymous EPID named base, wherein the requested action is related to a sale of goods or services and includes changing a monitory value of the monitory account.

9. The apparatus of claim 8, wherein the EPID verification is accomplished without specific electronic device information.

10. The apparatus of claim 8, wherein the monitory account is updated when the requested action is verified.

11. The apparatus of claim 8, wherein the account institution is a banking institution and the requested action is to add an electronic representation of monetary funds to the monitory account.

12. The apparatus of claim 8, wherein the apparatus is a payment card and the requested action is related to a sale of goods or services.

13. A method comprising:
couple an electronic device to a point of sale terminal using enhanced privacy identification (EPID), wherein the electronic device includes a monitory account;
verifying the monitory account with an account institution using EPID; and
requesting an action related to the monitory account using an EPID key, wherein the EPID key includes an anonymous EPID random base and a non-anonymous EPID named base, wherein the requested action is related to a sale of goods or services and includes changing a monitory value of the monitory account.

14. The method of claim 13, wherein the EPID verification is accomplished without specific electronic device information.

15. A payment system comprising:
a payment card configured to:
couple an electronic device to a point of sale terminal using enhanced privacy identification (EPID), wherein the electronic device includes a monitory account;
verify the monitory account with an account institution using EPID; and
request an action related to the monitory account using an EPID key, wherein the EPID key includes an anonymous EPID random base and a non-anonymous EPID named base, wherein the requested action is related to a sale of goods or services and includes changing a monitory value of the monitory account.

16. The payment system of claim 15, wherein the monitory account is updated when the requested action is verified.

17. The payment system of claim 15, wherein the account institution is a banking institution and the requested action is to add an electronic representation of monetary funds to the monitory account.

18. The at least one machine readable medium of claim 1, further comprising one or more instructions that when executed by the at least one processor, cause the at least one processor to:
receive EPID based verification data for the electronic device, wherein the EPID based verification data is used to verify the monitory account with the account institution.

19. The at least one machine readable medium of claim 1, further comprising one or more instructions that when executed by the at least one processor, cause the at least one processor to:
request user identification, wherein the user identification is used by the account institution to verify an identity of a user of the electronic device, wherein the monitory account is associated with the electronic device; and
request an action related to the monitory account using DAA, wherein the action includes changing a monitory value of the monitory account.

20. The at least one machine readable medium of claim 1, wherein the requested action related to the monitory account is a request to transfer money.

21. The at least one machine readable medium of claim 1, wherein the electronic device includes an EPID security key configured to include both the random state and the named base.

22. The at least one machine readable medium of claim 1, wherein the electronic device is a physical payment card.

* * * * *